US012286824B2

(12) United States Patent
Wei

(10) Patent No.: US 12,286,824 B2
(45) Date of Patent: Apr. 29, 2025

(54) LOW TRACK ASSEMBLY AND SLIDING DOOR

(71) Applicant: Ideal Sanitary Ware Co., Ltd., Guangdong (CN)

(72) Inventor: Wuxiang Wei, Guangdong (CN)

(73) Assignee: Ideal Sanitary Ware Co., Ltd. (CN)

( * ) Notice: Subject to any disclaimer, the term of this patent is extended or adjusted under 35 U.S.C. 154(b) by 197 days.

(21) Appl. No.: 17/613,770

(22) PCT Filed: Nov. 26, 2020

(86) PCT No.: PCT/CN2020/131903
§ 371 (c)(1),
(2) Date: Nov. 23, 2021

(87) PCT Pub. No.: WO2022/109948
PCT Pub. Date: Jun. 2, 2022

(65) Prior Publication Data
US 2022/0396987 A1 Dec. 15, 2022

(51) Int. Cl.
*E05D 15/06* (2006.01)
*E05D 13/00* (2006.01)
*E05F 5/00* (2017.01)

(52) U.S. Cl.
CPC ......... *E05D 15/0634* (2013.01); *E05D 13/00* (2013.01); *E05D 15/0652* (2013.01); *E05F 5/003* (2013.01); *E05Y 2900/132* (2013.01)

(58) Field of Classification Search
CPC . E05D 13/00; E05D 15/0652; E05D 15/0634; E05F 5/003
See application file for complete search history.

(56) References Cited

U.S. PATENT DOCUMENTS

| 8,402,606 B1 | 3/2013 | Tsai | |
|---|---|---|---|
| 2006/0185250 A1* | 8/2006 | Gosling | E06B 3/4618 49/138 |
| 2008/0148639 A1* | 6/2008 | Jakob-Bamberg | E05D 15/0652 49/130 |
| 2015/0026928 A1* | 1/2015 | Haab | E05F 1/16 16/96 R |

(Continued)

FOREIGN PATENT DOCUMENTS

| AU | 2019236679 | * 11/2018 |
|---|---|---|
| CA | 2464637 C | 6/2012 |

(Continued)

OTHER PUBLICATIONS

Chinese Search Report for Application No. PCT/CN2020/131903, Dated Aug. 20, 2021, 3 pages.

*Primary Examiner* — Gregory J Strimbu
(74) *Attorney, Agent, or Firm* — Lerner David LLP

(57) ABSTRACT

A sliding door includes a low track assembly with first slide grooves, and pulleys located in the track assembly. Each pulley includes a support, a roller assembly, and a hanging clamp, where the supports move in the first slide grooves. Each pulley further includes a first accommodating groove, an accommodating site that is perpendicular to and runs through the first accommodating groove, a second accommodating groove, a stop wall at a first end of the accommodating side, a second slide groove in the stop wall, and the second slide groove extends in a height direction of the track assembly.

9 Claims, 13 Drawing Sheets

(56) References Cited

U.S. PATENT DOCUMENTS

| | | | |
|---|---|---|---|
| 2018/0058121 A1* | 3/2018 | Ishii | E05F 1/02 |
| 2018/0320430 A1* | 11/2018 | Wei | E05F 5/027 |
| 2021/0340798 A1* | 11/2021 | Racicot | E05D 15/0634 |
| 2022/0154505 A1* | 5/2022 | Wei | E05F 5/003 |

FOREIGN PATENT DOCUMENTS

| | | | |
|---|---|---|---|
| CA | 2933144 A1 | | 12/2016 |
| CN | 201416363 Y | | 3/2010 |
| CN | 202347985 U | | 7/2012 |
| CN | 105683469 A | | 6/2016 |
| CN | 110199077 A | | 9/2019 |
| CN | 111550159 A | | 8/2020 |
| CN | 112585330 A | | 3/2021 |
| WO | WO 2006/118574 | * | 11/2006 |
| WO | WO 2021/237803 | * | 12/2021 |

* cited by examiner

LOW TRACK ASSEMBLY AND SLIDING DOOR

CROSS-REFERENCE TO RELATED APPLICATION

The present application is a national phase entry under 35 U.S.C. § 371 of International Application PCT/CN2020/131903 filed Nov. 26, 2020, all of which is hereby incorporated herein by reference.

TECHNICAL FIELD

The present invention relates to the field of door technologies, and in particular, to a low track assembly and a sliding door provided with the low track assembly.

BACKGROUND

Currently, people usually arrange sliding doors in toilet rooms, kitchen passages, and balcony passages. The common sliding doors for passages usually are sliding doors with glass plates. A linear partition wall is usually arranged on a mounting place of a sliding door, a track assembly for the sliding door is mounted in the partition wall, and one or more movable doors capable of sliding along a track are hung below the track assembly.

Currently, the track assembly mainly includes a track and pulleys, where the pulleys are slidably mounted in the track. The pulley includes a support and a roller assembly, where the rollers are mounted on the support, hanging clamps are provided below the support, and the hanging clamps are configured to clamp a glass door plate. However, due to hole limitation of the glass door plates and size limitation of the track, for ease of mounting of the glass door plates, the hanging clamps below the support are usually exposed outside the track, but this greatly affects attractiveness of the sliding door. Therefore, to improve attractiveness of the sliding door, there are mainly two existing solutions as follows.

In the first solution, a width and length of the track are increased, so that the support, the roller assembly, and the hanging clamps below the support are all hidden in the track. This solution can prevent the hanging clamps from being exposed outside the track, but still affects attractiveness of the sliding door to some extent.

In the second solution, as shown in FIG. 1, a track 91 is still a low track, but a support 92 and a hanging clamp 93 of a pulley are arranged into a separated structure. An accommodating site 921 is provided on the support 92 to accommodate the hanging clamp 93, a through-hole 922 is provided at the top of the support 92, a threaded hole 931 is provided at the top of the hanging clamp 93, and an operation hole 911 is provided at the top of the track 91. During connection, a bolt 94 is placed into a slide groove 912 of the track 91 through the operation hole 911, and the bolt 94 is in threaded connection with a threaded hole 931 at the top of the hanging clamp 93 after penetrating through the through-hole 922 at the top of the support 92, so that the hanging clamp 93 is fixed to the support 92. This solution can prevent the hanging clamp 93 from being exposed outside the track 94, but has the problem that: a top of the track 91 is generally in contact with a ceiling of a passage, so that connection of a track assembly 9 and a glass door plate needs to be completed first and then the track 91 can be mounted on the ceiling of the passage. This causes mounting of the sliding door to be troublesome. In addition, the glass door plate is difficult to adjust and replace after being mounted, causing great later maintenance difficulty of the sliding door.

Technical Problem

To solve the foregoing problem, a principal objective of the present invention is to provide a low track assembly that facilitates mounting, adjustment, and replacement of movable door plates, facilitates mounting and maintenance of a sliding door, and can improve attractiveness of the sliding door.

Another objective of the present invention is to provide a sliding door provided with the low track assembly.

Technical Solution

To implement the principal objective of the present invention, the present invention provides a low track assembly, including a track and pulleys, where first slide grooves that run through the track in a first direction are provided on the track; the pulleys are provided in the first slide grooves, the pulleys each includes a support, a roller assembly, and a hanging clamp, where the roller assembly is mounted on the support, the support moves in the first slide groove by using the roller assembly, a first accommodating groove and an accommodating site are provided on the support, the first accommodating groove runs through the support in the first direction, the accommodating site runs through the first accommodating groove in a second direction, a second accommodating groove that runs through the hanging clamp in the first direction is provided on the hanging clamp, the hanging clamp is located in the accommodating site, and the second accommodating groove communicates with the first accommodating groove; a stop wall is provided on the support at a first end of the accommodating site, a second slide groove is provided on the stop wall, the second slide groove extends in a height direction of the track and runs through the stop wall in the second direction, and the first direction, the second direction, and the height direction are perpendicular to each other; a threaded hole that runs through the hanging clamp in the second direction is further provided on the hanging clamp; and the pulley further includes a locking piece and a bolt, where the stop wall is located between the locking piece and the hanging clamp, a connection hole that runs through the locking piece in the second direction is provided on the locking piece, the bolt is in threaded connection with the threaded hole after penetrating through the connection hole and the second slide groove, the locking piece and the hanging clamp are capable of synchronously moving along the second slide groove, first operation holes communicating with the first slide groove are provided on a first side wall of the track, and the locking piece is capable of moving along the first slide groove to the first operation holes.

According to a preferable solution, a first tooth part is further provided on the stop wall, a second tooth part is provided on the locking piece, and the first tooth part meshes with the second tooth part.

According to a further solution, a groove is further provided on the stop wall, the groove extends in the height direction, in the second direction, the groove is recessed into the stop wall from a surface of the stop wall facing the locking piece, and a projection of the second slide groove is located in a projection of the recess; and the locking piece is located in the recess.

According to a still further solution, a boss is further provided on the locking piece, the boss protrudes out of the locking piece in the second direction, the boss is located in the second slide groove, and the boss is capable of sliding along the second slide groove.

According to a still further solution, the first tooth part is located on a bottom wall of the recess, and the second tooth part is located on a surface of the locking piece facing the first tooth part; or the first tooth part is located on a side wall of the recess, and the second tooth part is located on a surface of the locking piece facing the first tooth part; the first tooth part includes a plurality of first convex teeth, where the plurality of first convex teeth are distributed in the height direction; the second tooth part includes a plurality of second convex teeth, where the plurality of second convex teeth are distributed in the height direction, and the number of the first convex teeth is greater than the number of the second convex teeth; and the support is provided with roller concave sites on one side of the support.

According to another preferable solution, a gasket is disposed between the stop wall and the locking piece.

According to another preferable solution, the low track assembly further includes: dampers and damping generators, where the dampers are located in the first slide grooves, two ends of the damper are each provided with one pulley, and the damper has triggering ends; insertion holes that run through the track in the height direction are provided on a bottom wall of the track, the damping generator has triggering parts, the triggering part penetrates through the insertion hole and extends into the first slide groove, and the triggering end is capable of moving along the first slide groove to be in contact with the triggering part.

According to a further solution, two first slide grooves are provided, and the two first slide grooves are distributed in the second direction; one damper and two pulleys are provided in one first slide groove, two insertion holes are provided, one insertion hole communicates with one first slide groove, two triggering parts are provided, and one triggering part penetrates through one insertion hole and extends into one corresponding first slide groove; and second operation holes are provided on a second side wall of the track, the first operation holes communicate with the first one of the first slide grooves, the second operation holes communicate with the second one of the first slide grooves, and the first side wall is parallel to the second side wall.

According to a still further solution, the low track assembly further includes: a decoration cover assembly and a bottom guide member, where the decoration cover assembly covers the first side wall and the second side wall of the track; in the height direction, the bottom guide member is located below the track, limiting grooves that run through the bottom guide member in the first direction are provided on the bottom guide member, a door plate limiting site is formed between the limiting groove and the first slide groove, and the number of the limiting grooves is equal to the number of the first slide grooves.

To implement another objective of the present invention, the present invention provides a sliding door, which includes movable door plates, where the sliding door further includes the foregoing low track assembly, a part of a top of the movable door plate is located in the first accommodating groove and the second accommodating groove, and the movable door plate is fixedly connected to the hanging clamps.

BENEFICIAL EFFECT

In the low track assembly provided in the present invention, through structural design of the low track assembly, the accommodating site on the support can be configured to accommodate the hanging clamp, so that the entire hanging clamp can be located in the support, the hanging clamp is prevented from extending out of the track. In addition, a width and height of the track do not need to be increased to hide the hanging clamp in the track, thereby ensuring overall attractiveness of the low track assembly and also ensuring overall attractiveness of the sliding door provided with the low track assembly. The stop wall with the second slide groove, the locking piece, and the bolt are provided on a support, so that the locking piece and the bolt can fix the hanging clamp to the stop wall, and the hanging clamp moves along with the support, so that the movable door plate of the sliding door mounted on the hanging clamps is driven by the hanging clamps to move. In addition, through position arrangement of the stop wall, the second slide groove, and the first operation holes on the track, mounting difficulty of the movable door plate can be reduced, so that after the movable door plate is mounted on the low track assembly, the height position of the movable door plate is adjustable, and it is simpler and more convenient to replace the movable door plate, thereby greatly reducing later maintenance difficulty of the sliding door provided with the low track assembly.

The first tooth part that is provided on the stop wall and the second tooth part that is provided on the locking piece can prevent the locking piece from sliding relative to the stop wall after the locking piece and the bolt clamp the hanging clamp onto the stop wall, so that reliability of clamping the hanging clamp by using the locking piece and the bolt is improved, the movable door plate mounted on the hanging clamps is prevented from moving downwards after the completion of mounting, and the sliding door can be normally used. In addition, the movable door plate is protected from damage, thereby ensuring use safety of the sliding door.

The groove for accommodating the locking piece is provided on the stop wall, so that the locking piece can be prevented from protruding out of the stop wall, so as to reduce a width of the pulley, reduce a width of the first slide groove, and finally reduce a width of the track, thereby improving attractiveness of the low track assembly and the sliding door provided with the low track assembly.

The boss on the locking piece guides and limits the locking piece, so that the locking piece better slides along the second slide groove. In addition, the boss can further increase a connection length of the locking piece and the bolt, so as to improve connection reliability of the bolt and the locking piece and increase rigidity and strength of the entire locking piece, so that the locking piece is not prone to damage.

The gasket can prevent the locking piece from sliding relative to the stop wall after the locking piece and the bolt clamp the hanging clamp onto the stop wall, so that reliability of clamping the hanging clamp by using the locking piece and the bolt is improved, the movable door plate mounted on the hanging clamps is prevented from moving downwards after the completion of mounting, and the sliding door can be normally used. In addition, the movable door plate is protected from damage, thereby ensuring use safety of the sliding door.

In addition, the damping generator is configured to trigger a damping function of the dampers, so as to buffer the movable door plate mounted on the hanging clamps during door closing. In addition, the decoration cover assembly is configured to decorate the track, so as to cover up the first operation holes and the second operation holes on the track, thereby improving attractiveness of the low track assembly and the sliding door provided with the low track assembly. The bottom guide member is configured to cooperate with the track and the pulleys to guide and protect the movable door plate.

The sliding door provided in the present invention includes the foregoing low track assembly, so that it is simpler and more convenient to mount, adjust and replace the movable door plates of the sliding door, mounting and maintenance of the sliding door are facilitated, and attractiveness of the sliding door can be improved.

The following further describes the present invention with reference to the accompanying drawings and embodiments.

DESCRIPTION OF EMBODIMENTS

Sliding Door Embodiment 1

Figure 1:
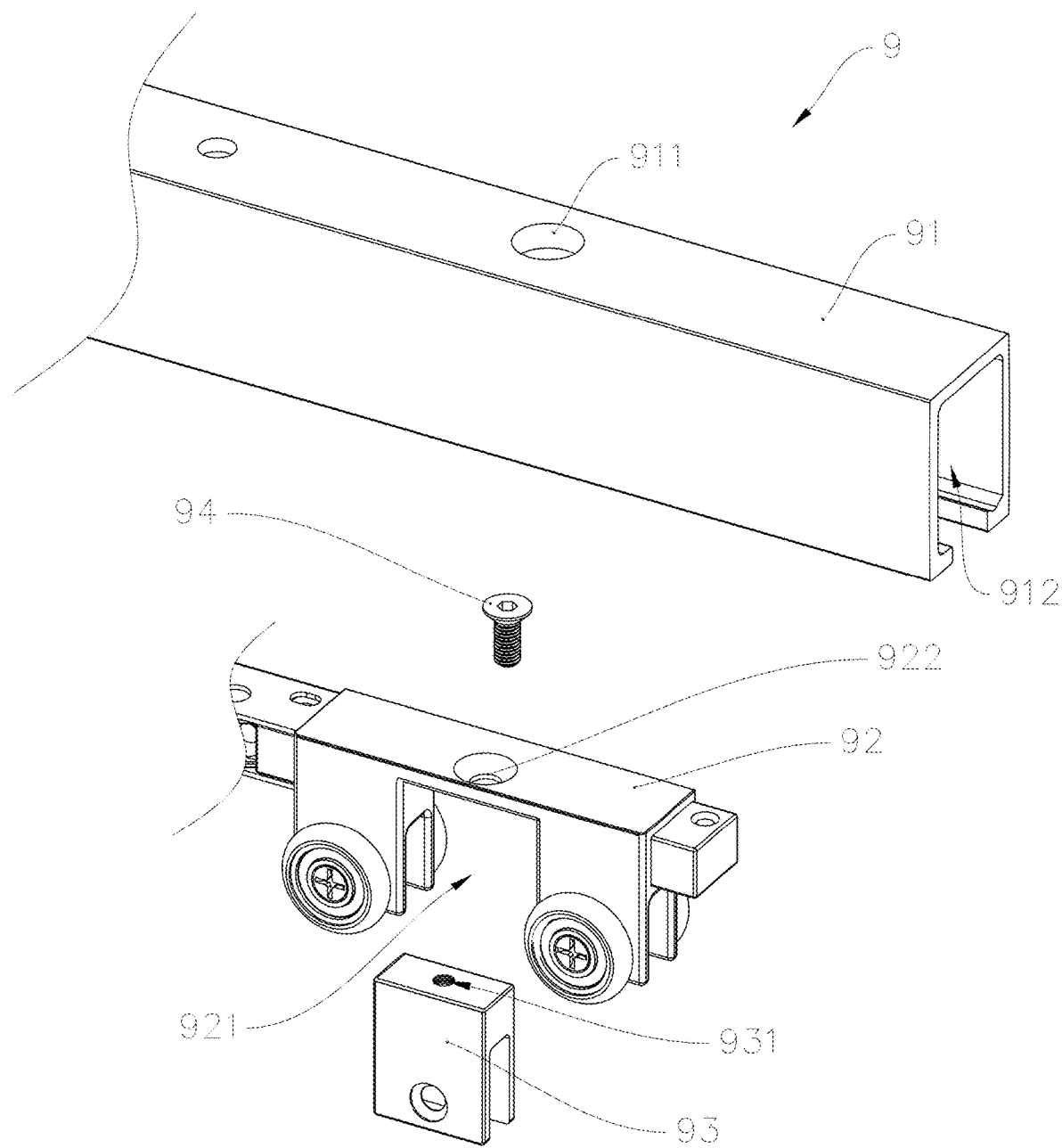
FIG. 1 is an exploded view of an existing low track assembly.
Figure 2:
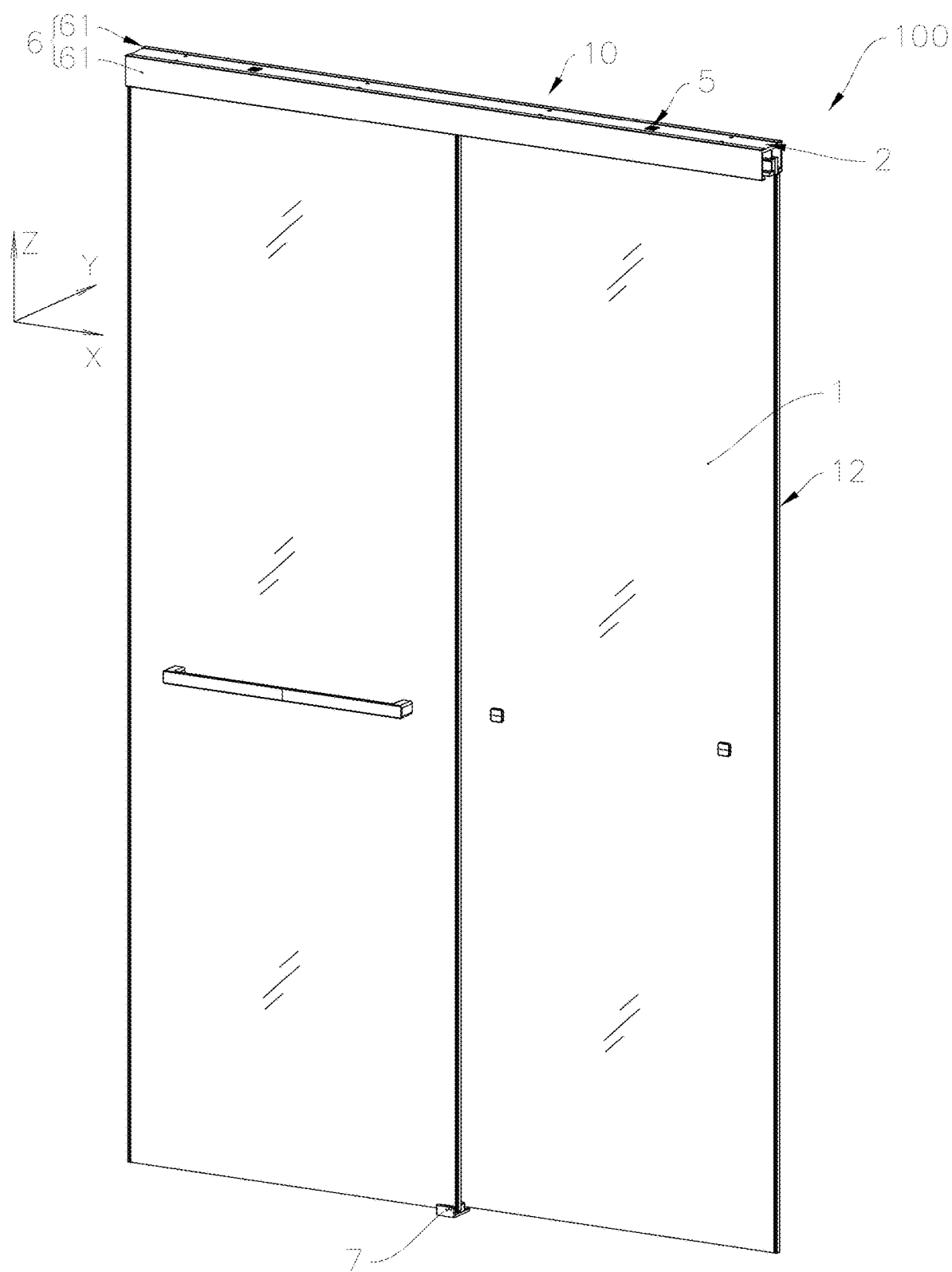
FIG. 2 is a structural diagram of sliding door Embodiment 1 of the present invention from a first perspective.
Figure 3:
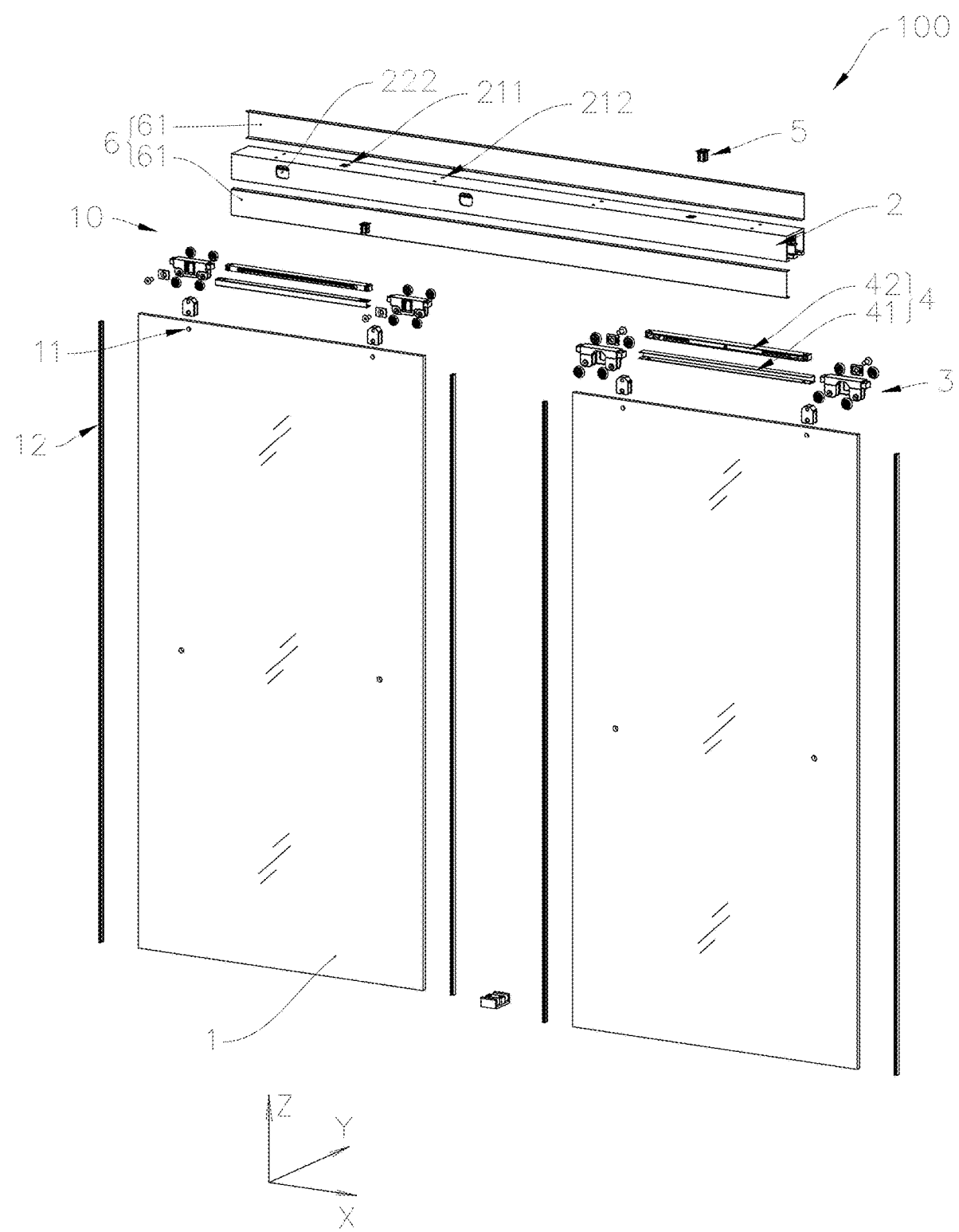
FIG. 3 is an exploded view of sliding door Embodiment 1 of the present invention.

Referring to FIG. 2 and FIG. 3, a sliding door 100 includes movable door plates 1 and a low track assembly 10.

The movable door plate 1 preferably uses a glass door plate, and two or more second connection holes 11 are preferably provided at the top of the movable door plate 1. For example, in this embodiment, two second connection holes 11 are provided at the top of the movable door plate 1, the two second connection holes 11 are distributed in a first direction X, and each second connection hole 11 runs through the movable door plate 1 in a second direction Y. The first direction X, the second direction Y, and a height direction Z of the sliding door 100 are perpendicular to each other. In addition, in the first direction X, anti-collision members 12 are provided on two side walls of the movable door plate 1 respectively. The anti-collision members 12 can protect the movable door plate 1 in a door opening and closing process of the sliding door 100, so as to protect the side walls of the movable door plate 1 from rigid collision with wall bodies of a passage. Certainly, in other embodiments, anti-collision members 12 may alternatively be provided on the wall bodies of the passage, or anti-collision members 12 are provided on both the movable door plate 1 and the wall bodies of the passage.

Figure 4:
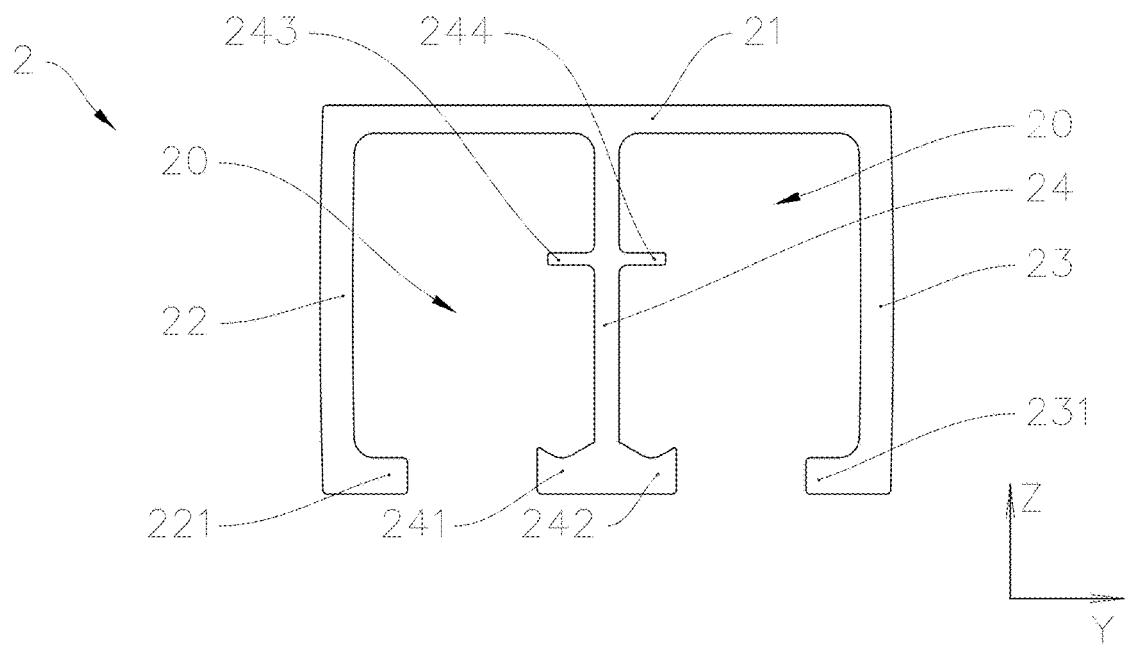
FIG. 4 is a structural diagram of a track in sliding door Embodiment 1 of the present invention from a first perspective.
Figure 5:
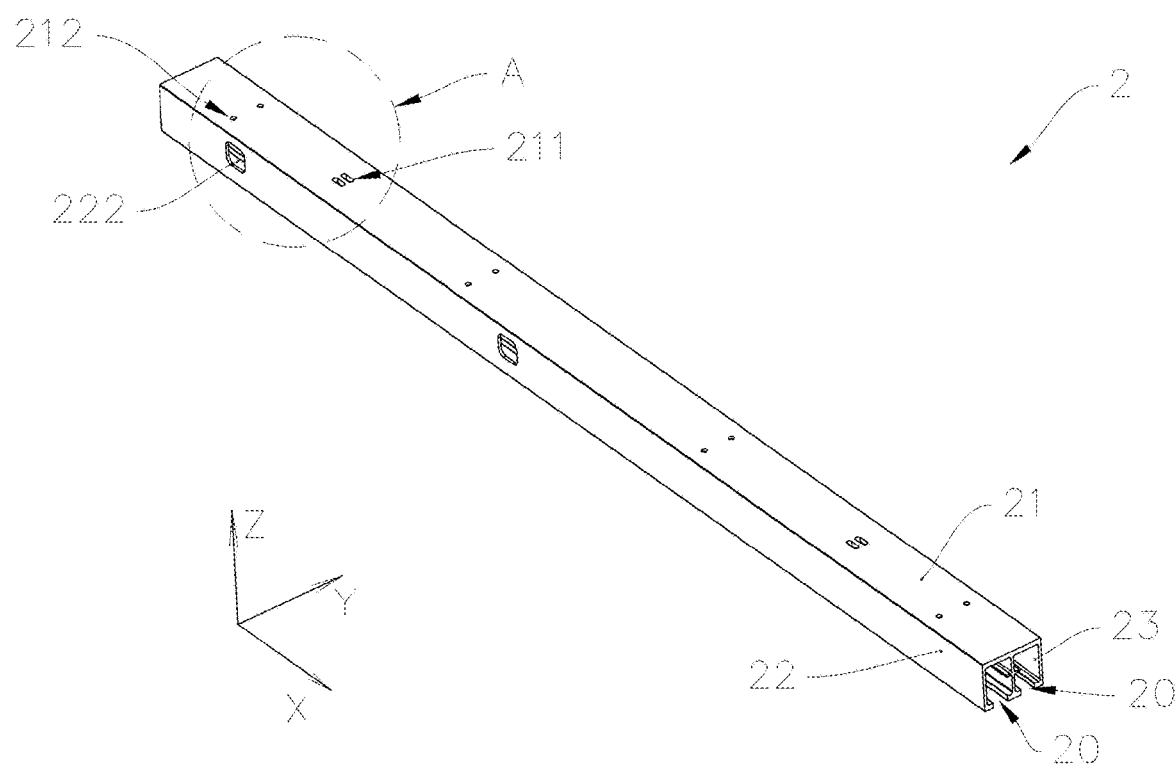
FIG. 5 is a structural diagram of a track in sliding door Embodiment 1 of the present invention from a second perspective.
Figure 6:
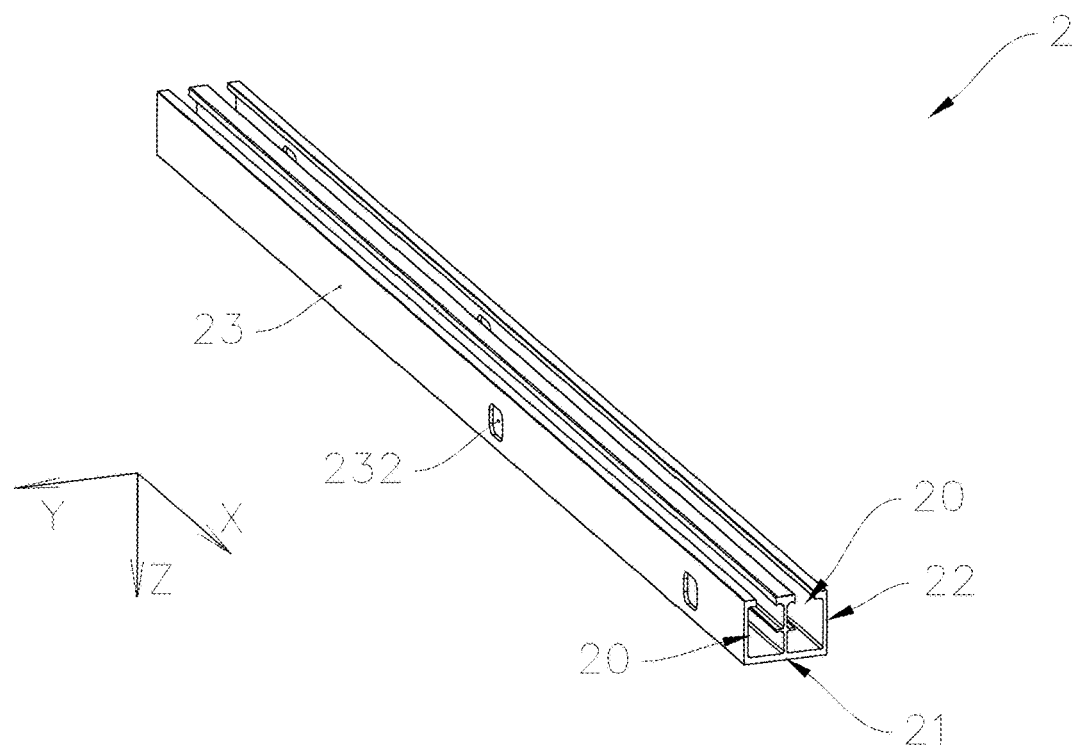
FIG. 6 is a structural diagram of a track in sliding door Embodiment 1 of the present invention from a third perspective.
Figure 7:
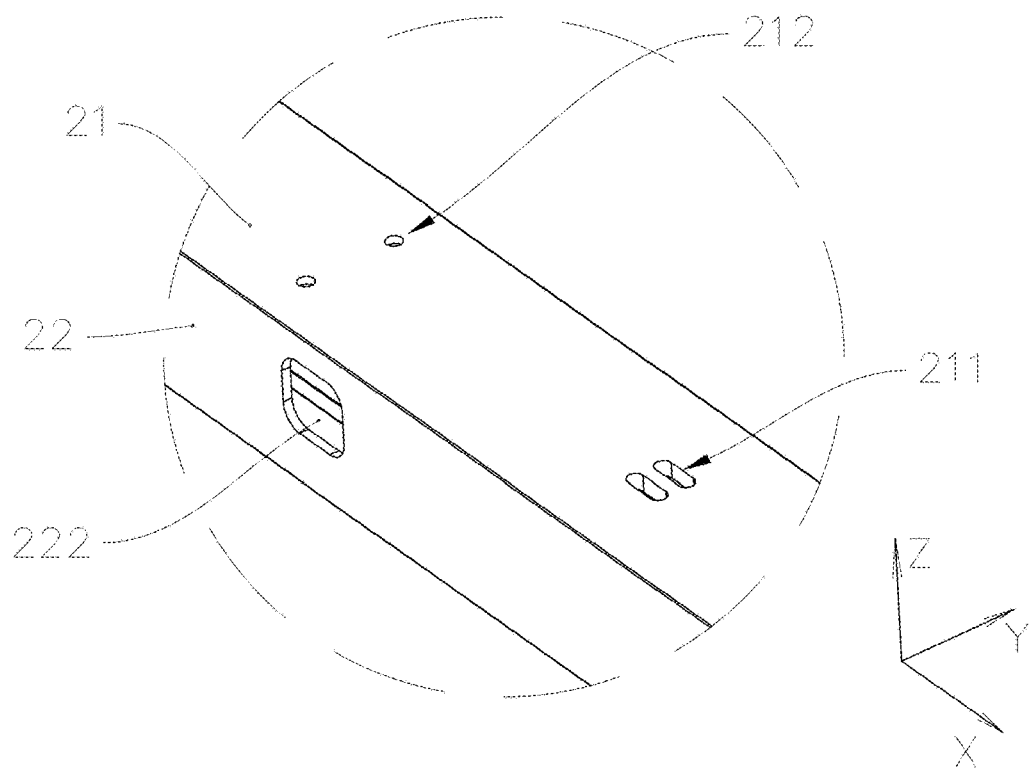
FIG. 7 is an enlarged diagram of a position A in FIG. 5.

The low track assembly 10 include a track 2, pulleys 3, dampers 4, damping generators 5, a decoration cover assembly 6 and a bottom guide member 7. With reference to FIG. 4 to FIG. 6, two first slide grooves 20 are provided on the track 2, and the first slide grooves 20 run through the track 2 in the first direction X.

Specifically, the track 2 includes a bottom wall 21, a first side wall 22, a second side wall 23, and a middle partition plate 24, where the first side wall 22 extends in the height direction Z from a first side of the bottom wall 21 to a portion of the height of the sliding door 100, the second side wall 23 extends in the height direction Z from a second side of the bottom wall 21 to the bottom of the sliding door 100, the first side wall 22 and the second side wall 23 are distributed in the second direction Y, and the first side wall 22 and the second side wall 23 are parallel to each other. The middle partition plate 24 is disposed between the first side wall 22 and the second side wall 23, the middle partition plate 24 extends in the height direction Z from a middle position of the bottom wall 21 to the bottom of the sliding door 100, and the middle partition plate 24 is parallel to the first side wall 22, so that the first one of the first slide grooves 20 is formed between the first side wall 22 and the middle partition plate 24, and the second one of the first slide grooves 20 is formed between the middle partition plate 24 and the second side wall 23. In addition, a first barrier strip 221 is provided on a tail end of the first side wall 22 that extends out, the first barrier strip 221 extends in the first direction X, and the first barrier strip 221 extends out in the second direction Y from the first side wall 22 to the middle partition plate 24; a second barrier strip 231 is provided on a tail end of the second side wall 23 that extends out, the second barrier strip 231 extends in the first direction X, and the second barrier strip 231 extends out in the second direction Y from the second side wall 23 to the middle partition plate 24; a third barrier strip 241 and a fourth barrier strip 242 are provided on a tail end of the middle partition plate 24 that extends out, the third barrier strip 241 and the fourth barrier strip 242 both extend in the first direction X, the third barrier strip 241 extends out in the second direction Y from the middle partition plate 24 to the first barrier strip 221, and the fourth barrier strip 242 extends out in the second direction Y from the middle partition plate 24 to the second barrier strip 231, so that a cross section of the first slide groove 20 is substantially T-shaped; and an opening of the first one of the first slide grooves 20 is formed between the first barrier strip 221 and the third barrier strip 241, an opening of the second one of the first slide grooves 20 is formed between the second barrier strip 231 and the fourth barrier strip 242, so that in a height direction of the track 2 (that is, the height direction Z of the foregoing sliding door 100), the opening of each first slide groove 20 is located at the bottom of the track 2.

A connection hole group 212 and two insertion hole groups 211 are provided on the bottom wall 21 of the track 2. The connection hole group 212 includes a plurality of third connection holes that run through the bottom wall 21 in the height direction Z, and the third connection holes are configured to connect the track 2 to a ceiling of a passage. The two insertion hole groups 211 are distributed in the first direction X, and the two insertion hole groups 211 are correspondingly provided on a first limit position and a second limit position for the movable door plate 1 that slides along the track 2. Each insertion hole group 211 include two insertion holes that are distributed in the second direction Y, where the insertion holes run through the bottom wall 21 in the height direction Z, and one insertion hole communicates with one first slide groove 20.

First operation holes 222 are provided on the first side wall 22, and the first operation holes 222 run through the first side wall 22 in the second direction Y and communicate with the first one of the first slide grooves 20; and preferably two first operation holes 222 are provided, and the two first operation holes 222 are distributed in the first direction X. Second operation holes 232 are provided on the second side wall 23, and the second operation holes 232 run through the second side wall 23 in the second direction Y and communicate with the second one of the first slide grooves 20; and preferably two second operation holes 232 are provided, and the two second operation holes 232 are distributed in the first direction X.

One damper 4 and two pulleys 3 are provided in each first slide groove 20, where the two pulleys 3 are mounted at two ends of the damper 4 respectively. In this embodiment, two movable door plates 1 are provided, and one movable door plate 1 is fixedly connected to two pulleys 3 in one first slide groove 20, so that the pulleys 3 can drive the movable door plate 1 to move along the first slide groove 20. In addition, a top of the movable door plate 1 is located in one corresponding first slide groove 20.

Figure 8:
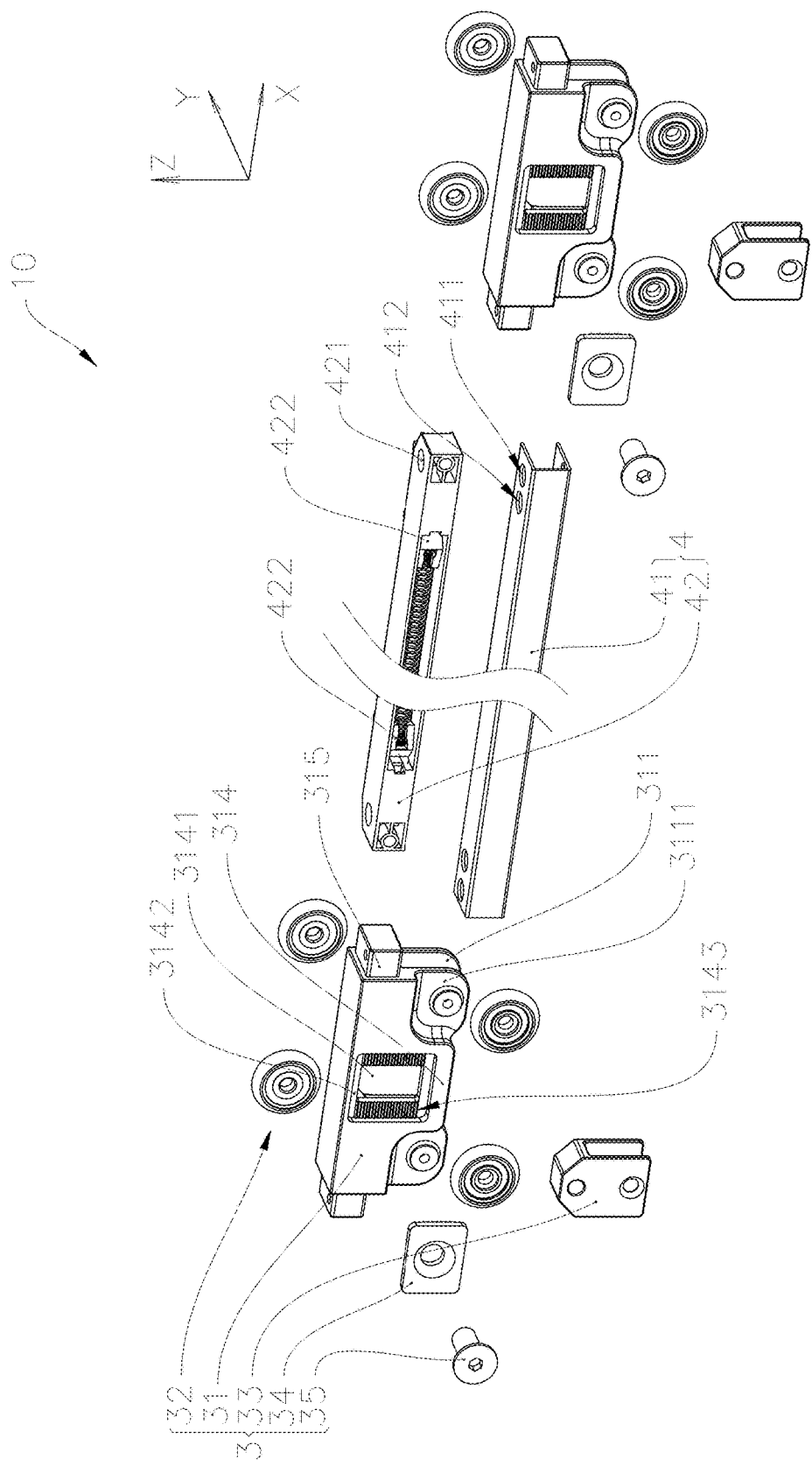
FIG. 8 is a first exploded view of sliding door Embodiment 1 of the present invention after some components are omitted.

Specifically, referring to FIG. 8, the pulley 3 includes a support 31, a roller assembly 32, a hanging clamp 33, a locking piece 34, and a bolt 35. Four roller mounting parts 311 are provided on the support 31. The roller assembly 32 includes four rollers, where one roller is mounted on one roller mounting part 311 in a manner of being rotatable around an axis of the roller. The support 31 may slide in the first slide groove 20 by using the roller assembly 32. The axis of the roller is parallel to the second direction Y. Two of the four rollers of the pulley 3 in the first one of the first slide grooves 20 abut against the first barrier strip 221, and the other two abut against the third barrier strip 241; and two of the four rollers of the pulley 3 in the second one of the first slide grooves 20 abut against the second barrier strip 231, and the other two abut against the fourth barrier strip 242. Preferably, with reference to FIG. 4 and FIG. 8, a fifth barrier strip 243 and a sixth barrier strip 244 are further provided on the middle partition plate 24, the fifth barrier strip 243 and the sixth barrier strip 244 both extend in the first direction X, the fifth barrier strip 243 extends out in the second direction Y to the first side wall 22, and the sixth barrier strip 244 extends out in the second direction Y to the second side wall 23. In the height direction Z, the fifth barrier strip 243 is located above the third barrier strip 241, and the sixth barrier strip 244 is located above the fourth barrier strip 242. The fifth barrier strip 243 can cooperate with the third barrier strip 241 to limit the rollers that are in the first one of the first slide grooves 20 and that are located between the third barrier strip 241 and the fifth barrier strip 243, so as to prevent the pulley 3 in the first one of the first slide grooves 20 from jumping in the height direction Z; and the sixth barrier strip 244 can cooperate with the fourth barrier strip 242 to limit the rollers that are in the second one of the first slide grooves 20 and that are located between the fourth barrier strip 242 and the sixth barrier strip 244, so as to prevent the pulley 3 in the second one of the first slide grooves 20 from jumping in the height direction Z.

Figure 9:
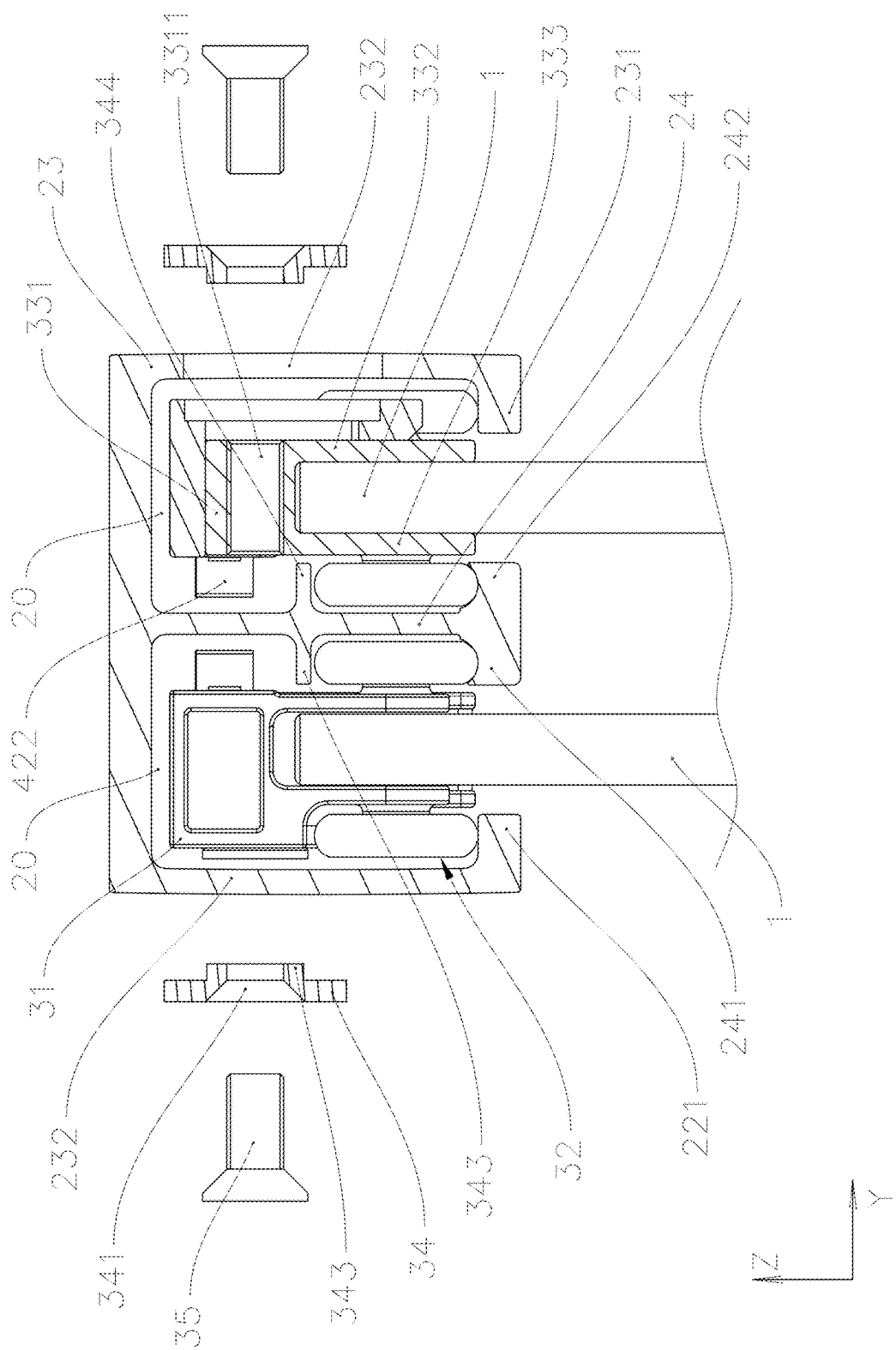
FIG. 9 is a partial structural cross-sectional view of sliding door Embodiment 1 of the present invention.
Figure 10:
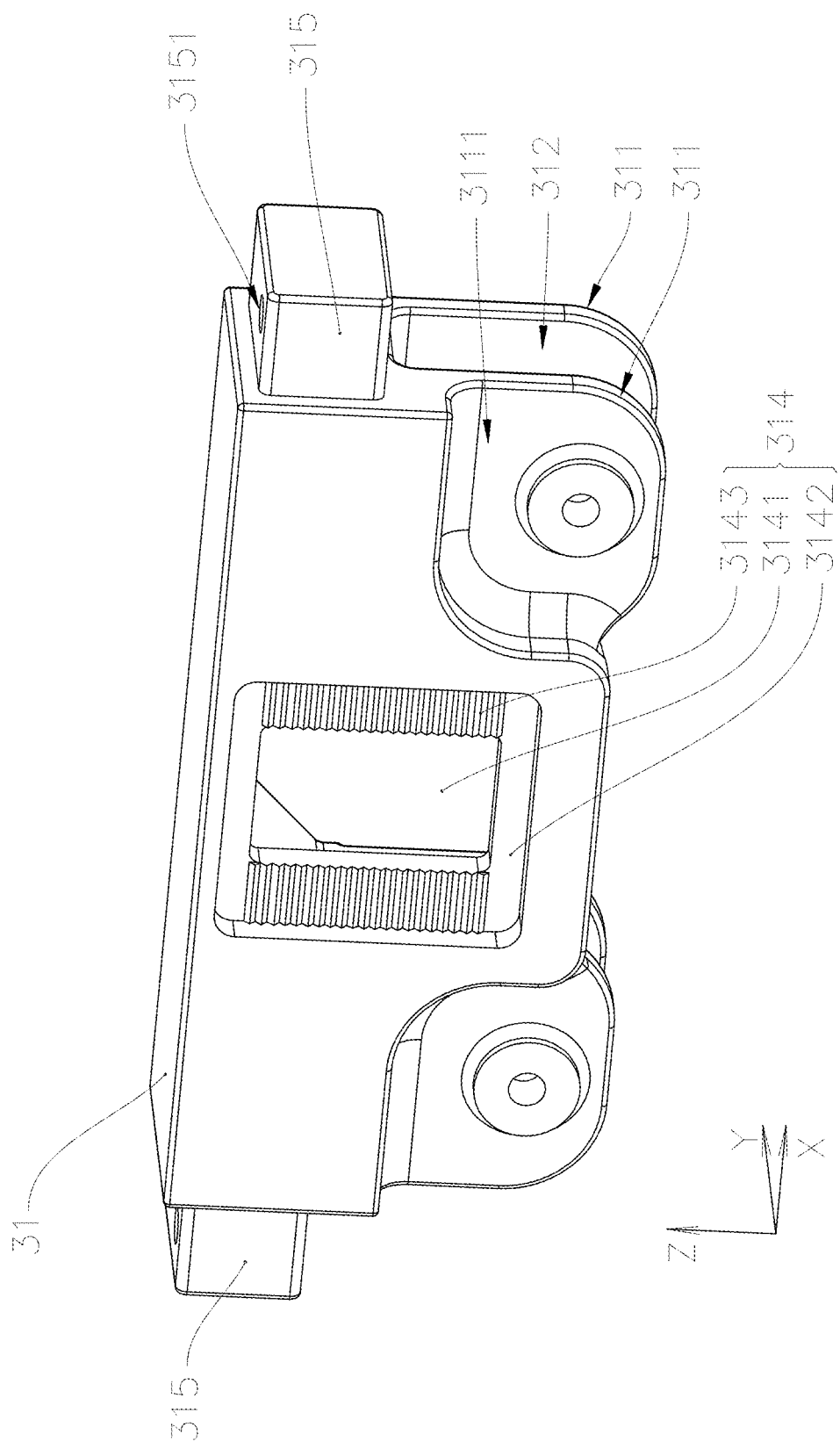
FIG. 10 is a structural diagram of a support in sliding door Embodiment 1 of the present invention from a first perspective.

With reference to FIG. 9 and FIG. 10, a first accommodating groove 312 and an accommodating site 313 are provided on the support 31, the first accommodating groove 312 runs through the support 31 in the first direction X, and the accommodating site 313 runs through the first accommodating groove 312 in the second direction Y. The first accommodating groove 312 is configured to accommodate the top of the movable door plate 1, and the accommodating site 313 is configured to accommodate the hanging clamp 33, so that the entire hanging clamp 33 can be located in the support 31, the hanging clamp 33 is prevented from extending out of the track 2. In addition, a width and height of the track 2 do not need to be increased to hide the hanging clamp 33 in the track 2, thereby ensuring overall attractiveness of the low track assembly 10 and also ensuring overall attractiveness of the sliding door 100.

A stop wall 314 is provided on the support 31 at a first end of the accommodating site 313. In addition, when the support 31 is mounted in the first slide groove 20, the stop wall 314 is disposed close to a side wall of the track 2 (for example, the first side wall 22 or the second side wall 23). A second slide groove 3141 is provided on the stop wall 314, the second slide groove 3141 extends in the height direction Z, and the second slide groove 3141 runs through the stop wall 314 in the second direction Y.

Preferably, a groove 3142 is provided on the stop wall 314, and the groove 3142 extends in the height direction Z; in the second direction Y, the groove 3142 is recessed into the stop wall 314 from a surface of the stop wall 314 that faces away from the accommodating site 313, and a projection of the second slide groove 3141 is located in a projection of the groove 3142; and the groove 3142 is configured to accommodate the locking piece 34, so that the locking piece 34 is prevented from protruding out of the stop wall 314, a width of the pulley 3 is reduced, and a width of the track 2 can be reduced, thereby improving attractiveness of the low track assembly 10 and the sliding door 100. Further, two roller concave sites 3111 are provided on a side of the support 31 having the stop wall 314, in the first direction X, the groove 3142 is located between the two roller concave sites 3111, and the roller concave sites 3111 are configured to accommodate two rollers located on one side of the stop wall 314, so that the two rollers located on the side having the stop wall 314 are prevented from protruding out of the stop wall 314, so as to reduce a width of the pulley 3 and a width of the track 2, thereby further improving attractiveness of the low track assembly 10 and the sliding door 100. In addition, a first tooth part 3143 is further provided on the stop wall 314, and the first tooth part 3143 is located on a bottom wall of the groove 3142. The first tooth part 3143 includes a plurality of first convex teeth, where the plurality of first convex teeth are distributed in the height direction Z.

Further, two connection blocks 315 are further provided on the support 31, in the first direction X, the two connection blocks 315 are located on two sides of the support 31 that face away from each other, respectively, and the connection blocks 315 are configured to be connected to the dampers 4. An eighth connection hole 3151 is provided on the connection block 315.

Figure 11:
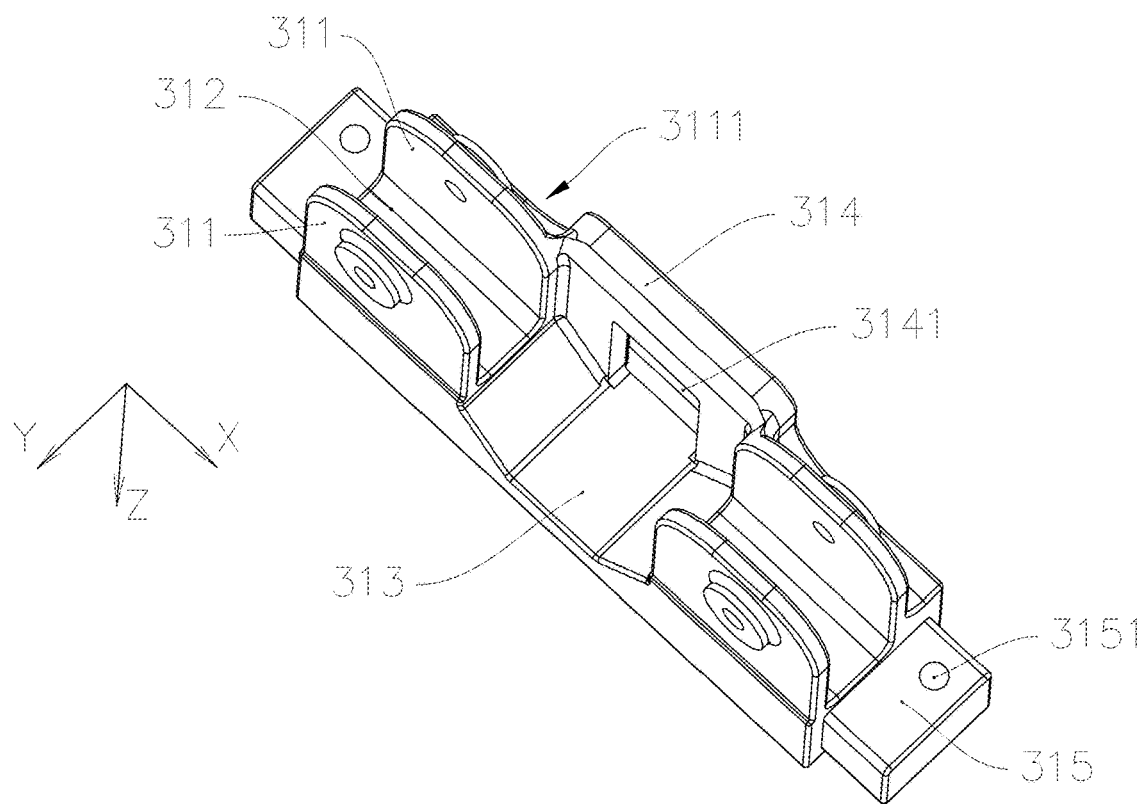
FIG. 11 is a structural diagram of a support in sliding door Embodiment 1 of the present invention from a second perspective.
Figure 12:
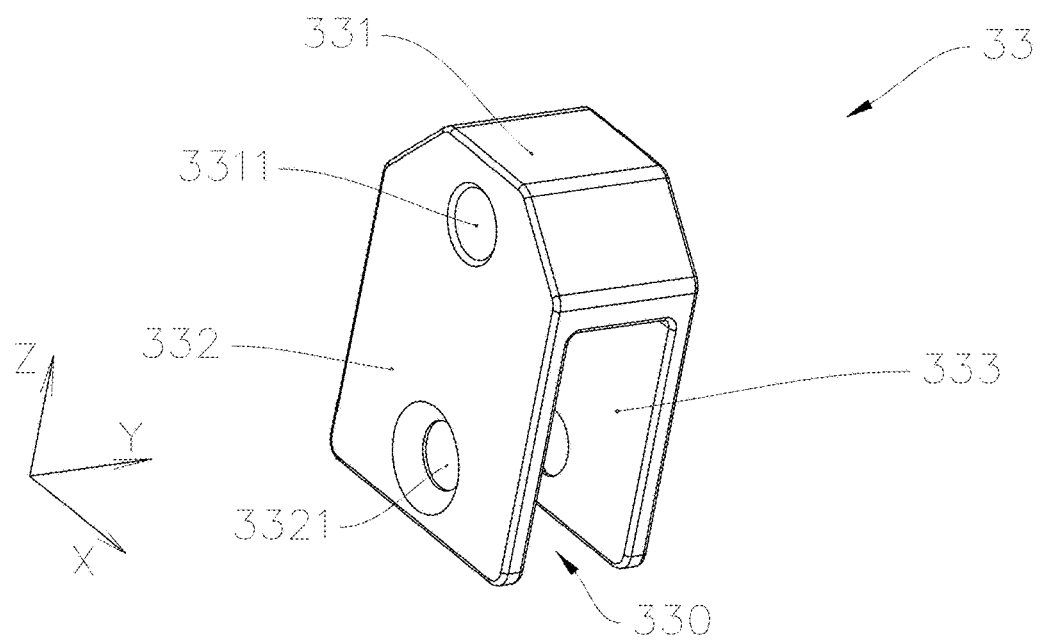
FIG. 12 is a structural diagram of a hanging clamp in sliding door Embodiment 1 of the present invention.

With reference to FIG. 11, the hanging clamp 33 is configured to be connected to the movable door plate 1, so as to fix the movable door plate 1 to the pulley 3. The hanging clamp 33 is detachably mounted in the accommodating site 313 of the support 31. The hanging clamp 33 has a main body 331, where a thread hole 3311 is provided on the main body 331, and the thread hole 3311 runs through the main body 331 in the second direction Y. A first clamping piece 332 and a second clamping piece 333 are provided on the main body 331, in the height direction Z, the first clamping piece 332 extends to the bottom of the sliding door 100 from a first side of a bottom of the main body 331, the second clamping piece 333 extends to the bottom of the sliding door 100 from a second side of a bottom of the main body 331, the first clamping piece 332 is parallel to the second clamping piece 333, and a second accommodating groove 330 that runs through the hanging clamp 33 in the first direction X is formed between the first clamping piece 332 and the second clamping piece 333. The second accommodating groove 330 communicates with the first accommodating groove 312 of the support 31, and the second accommodating groove 330 is configured to accommodate the top of the movable door plate 1. A fourth connection hole 3321 is further provided on the hanging clamp 33, and the fourth connection hole 3321 runs through the first clamping piece 332 and the second clamping piece 333 in the second direction Y. After the top of the movable door plate 1 is mounted into the second accommodating groove 330 of the hanging clamp 33, the fourth connection hole 3321 of the hanging clamp 33 is coaxial with one second connection hole 11 in the top of the movable door plate 1, and then a connection bolt penetrates through the fourth connection hole 3321 and the second connection hole 11, so as to fix the movable door plate 1 to the hanging clamp 33.

Figure 13:
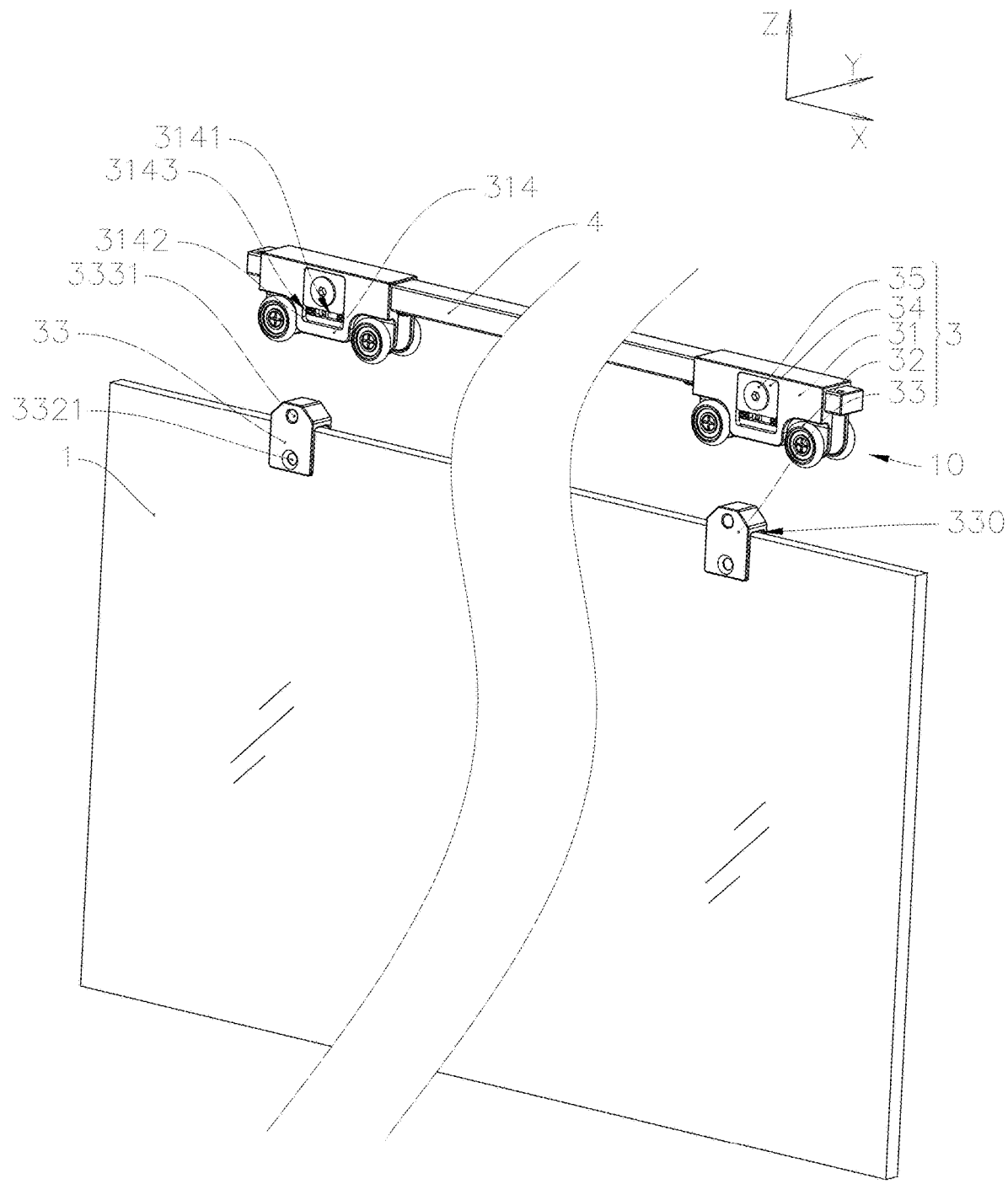
FIG. 13 is a second exploded view of sliding door Embodiment 1 of the present invention after some components are omitted.
Figure 14:
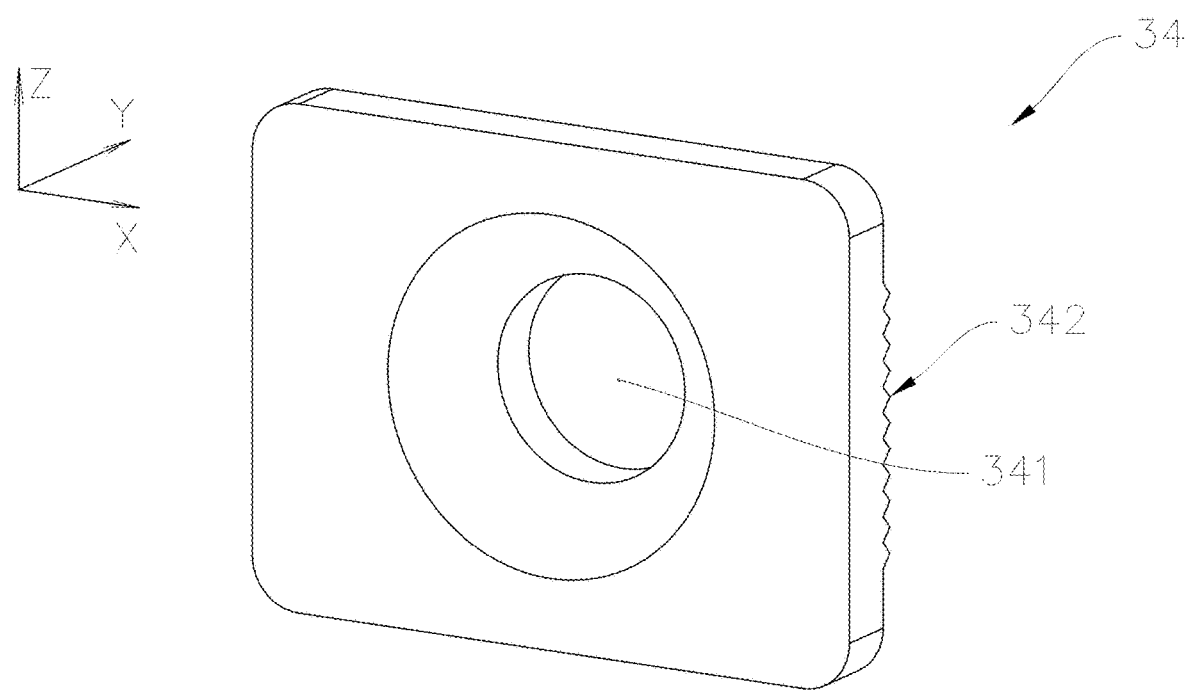
FIG. 14 is a structural diagram of a locking piece in sliding door Embodiment 1 of the present invention from a first perspective.

With reference to FIG. 13 and FIG. 14, in the second direction Y, the locking piece 34 and the hanging clamp 33 are located on two sides of the stop wall 314 of the support 31 that face away from each other, respectively, and the locking piece 34 is mounted in the groove 3142 and is capable of moving along the second slide groove 3141 relative to the support 31. A connection hole 341, a second tooth part 342, and a boss 343 are provided on the locking piece 34, and the boss 343 protrudes in the second direction Y to the stop wall 314 from a surface of the locking piece 34 facing the stop wall 314. In addition, when the locking piece 34 is mounted in the groove 3142, the boss 343 is located in the second slide groove 3141 and is capable of sliding relative to the second slide groove 3141. The connection hole 341 runs through the locking piece 34 and runs through the boss 343 in the second direction Y, and the boss 343 guides and limits sliding of the locking piece 34, so that the locking piece 34 can better slide along the second slide groove 3141. In addition, the boss 343 can further increase a connection length of the locking piece 34 and the bolt 35, so as to improve connection reliability of the bolt 35 and the locking piece 34 and increase rigidity and strength of the entire locking piece 34, so that the locking piece 34 is not prone to damage.

The second tooth part 342 is provided on a surface of the locking piece 34 facing the first tooth part 3143. The second tooth part 342 includes a plurality of second convex teeth, where the plurality of second convex teeth are distributed in the height direction Z. When the locking piece 34 is mounted in the groove 3142, the second convex teeth on the locking piece 34 mesh with the first convex teeth on the bottom wall of the groove 3142. The number of the first convex teeth is greater than the number of the second convex teeth.

When the hanging clamp 33 and the support 31 need to be fixedly connected, the hanging clamp 33 is placed in the accommodating site 313, and in addition, the locking piece 34 is placed in the groove 3142 of the stop wall 314, so that the boss 343 of the locking piece 34 is located in the second slide groove 3141 of the stop wall 314, and the connection hole 341 of the locking piece 34 is coaxial with the thread hole 3311 of the hanging clamp 33. Then, the bolt 35 is in threaded connection with the thread hole 3311 of the hanging clamp 33 after penetrating through the connection hole 341 of the locking piece 34, so as to fix the hanging clamp 33 to the support 31.

Figure 16:
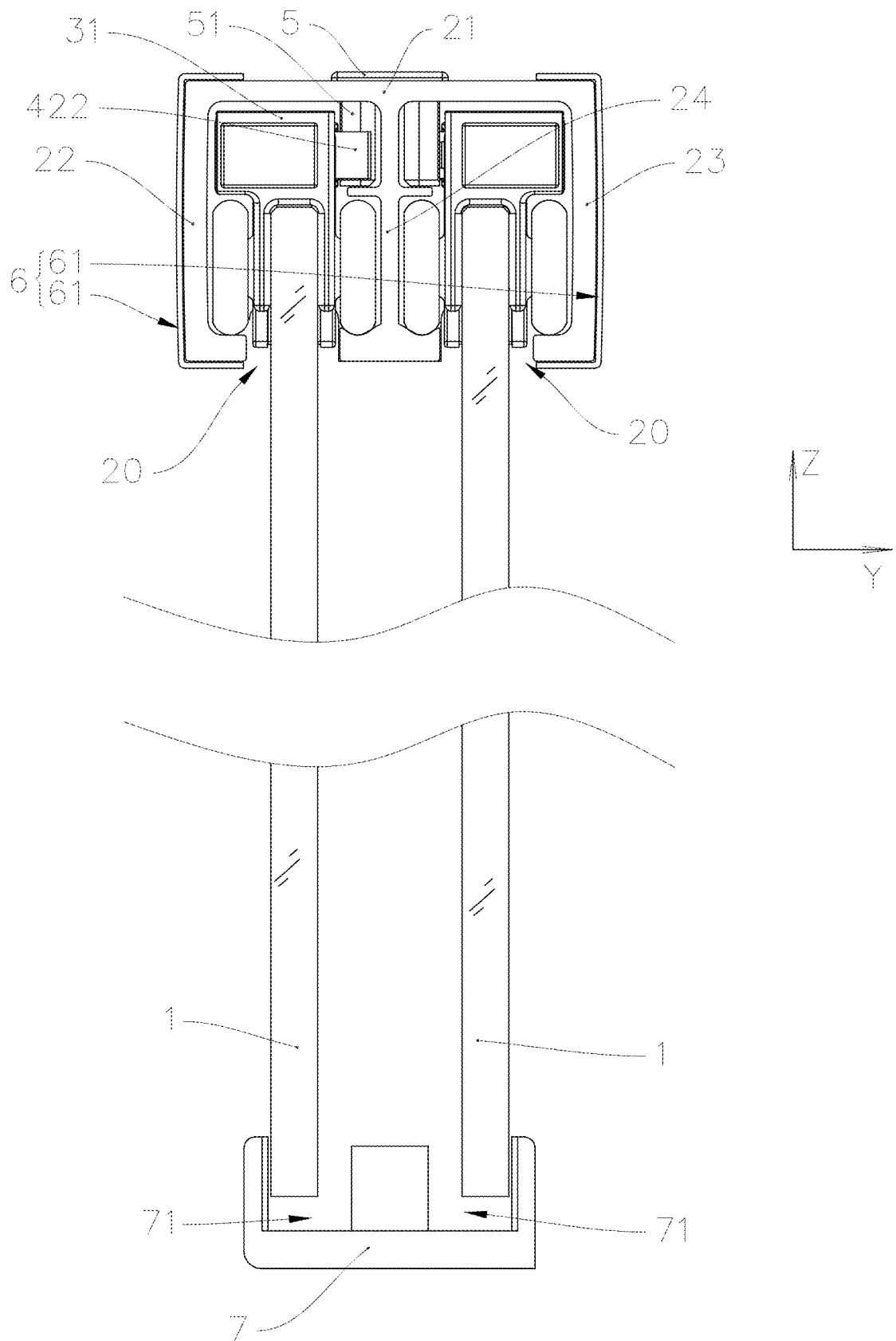
FIG. 16 is a structural diagram of sliding door Embodiment 1 of the present invention from a second perspective.

With reference to FIG. 8 and FIG. 16, the damper 4 includes a damper support 41 and a body 42. The damper support 41 extends in the first direction X, a cross section of the damper support 41 is U-shaped, and an opening of the U-shaped damper support 41 faces away from the stop wall 314. In addition, two fifth connection holes 411 and two sixth connection holes 412 are provided on a side wall of the damper support 41, the two fifth connection holes 411 are located at two ends of the damper support 41, the two sixth connection holes 412 are located between the two fifth connection holes 411, and the two sixth connection holes 412 are also located at the two ends of the damper support 41. When the support 31 of the pulley 3 is connected to the damper 4, the connection block 315 at an end of the support 31 is inserted into an end of the damper support 41, and the eighth connection hole 3151 on the connection block 315 is coaxial with the fifth connection hole 411. Then, a connection bolt is in threaded connection with the eighth connection hole 3151 after penetrating through the fifth connection hole 411, so as to fixedly mount the pulley 3 on the damper 4.

Two seventh connection holes 421 are provided on two ends of the body 42, and the two seventh connection holes 421 are located at two ends of the body 42 respectively. When the body 42 is mounted in the damper support 41, one seventh connection hole 421 of the body 42 is coaxial with one sixth connection hole 412 of the damper support 41. Then, connection bolts are in threaded connection with the seventh connection holes 421 after penetrating through the sixth connection holes 412, so as to fix the body 42 in the damper support 41. The body 42 has two triggering ends 422, the two triggering ends 422 are located at two ends of the body 42 respectively, and each triggering end 422 extends out of the damper support 41 from the opening of the U-shaped damper support 41. In addition, the two triggering ends 422 of the body 42 are in one-to-one correspondence with the two insertion hole groups 211 on the track 2. The triggering ends 422 of the body 42 are capable of moving along the first slide groove 20 along with the pulley 3 to one corresponding insertion hole group 211 on the track 2; and the locking piece 34 of the pulley 3 is capable of moving along the first slide groove 20 to the corresponding first operation hole 222 or the corresponding second operation hole 232 on the track 2. It should be noted that a first distance between the two first operation holes 222 on the first side wall 22 of the track 2 is equal to a second distance between the two second operation holes 232 on the second side wall 23 of the track, a third distance between the locking pieces 34 of the two pulleys 3 mounted at the two ends of the damper 4 is equal to the first distance, and a fourth distance between the two second connection holes 11 on the movable door plate 1 is equal to the third distance.

With reference to FIG. 16, two damping generators 5 are provided, the two damping generators 5 are in one-to-one correspondence with the two insertion hole groups 211, and the two damping generators 5 are in one-to-one correspondence with the two triggering ends 422 of each damper 4. The damping generator 5 has two triggering parts 51, the two triggering parts 51 are distributed in parallel in the second direction Y, and one triggering part 51 of the damping generator 5 is inserted into one insertion hole of one corresponding insertion hole group 211 and extends into the first slide groove 20 communicating with the insertion hole. When the triggering ends 422 of the damper 4 move along the first slide groove 20 along with the pulley 3 to the triggering parts 51 of one corresponding damping generator 5 and abut against the triggering parts 51, the triggering parts 51 trigger the corresponding triggering ends 422 on the damper 4, so that the damper 4 damps the pulley 3 and the movable door plate 1 in a movement process, so as to buffer the sliding door plate during door opening or door closing.

Figure 15:
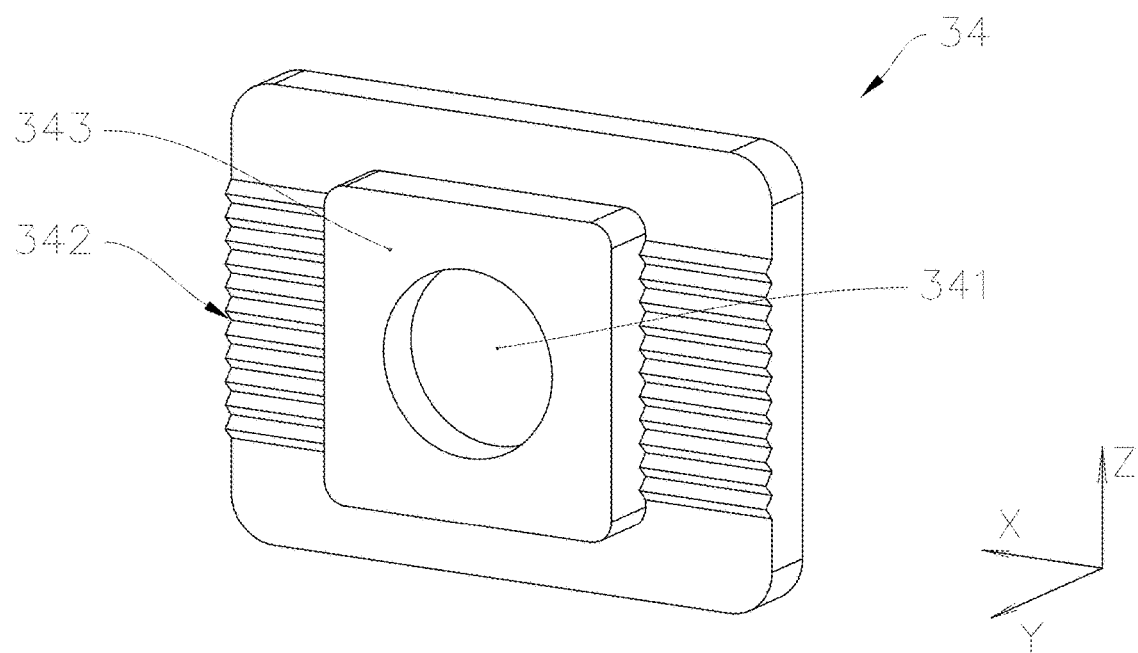
FIG. 15 is a structural diagram of a locking piece in sliding door Embodiment 1 of the present invention from a second perspective.

As shown in FIG. 3 and FIG. 15, the decoration cover assembly 6 includes two decoration covers 61, where the two decoration covers 61 are mounted on the first side wall 22 and the second side wall 23 of the track 2 in a covering manner respectively, the decoration cover assembly 6 is configured to decorate the track 2, so as to cover up the first operation holes 222 and the second operation hole 232 on the track 2, thereby improving attractiveness of the low track assembly 10 and the sliding door 100.

Figure 17:
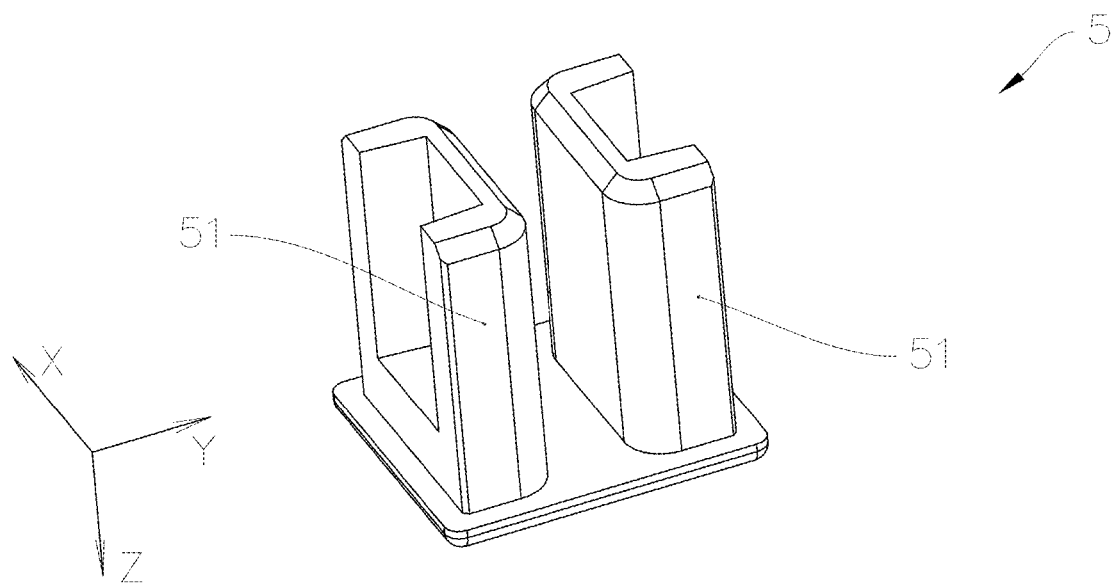
FIG. 17 is a structural diagram of a damping generator in sliding door Embodiment 1 of the present invention.
Figure 18:
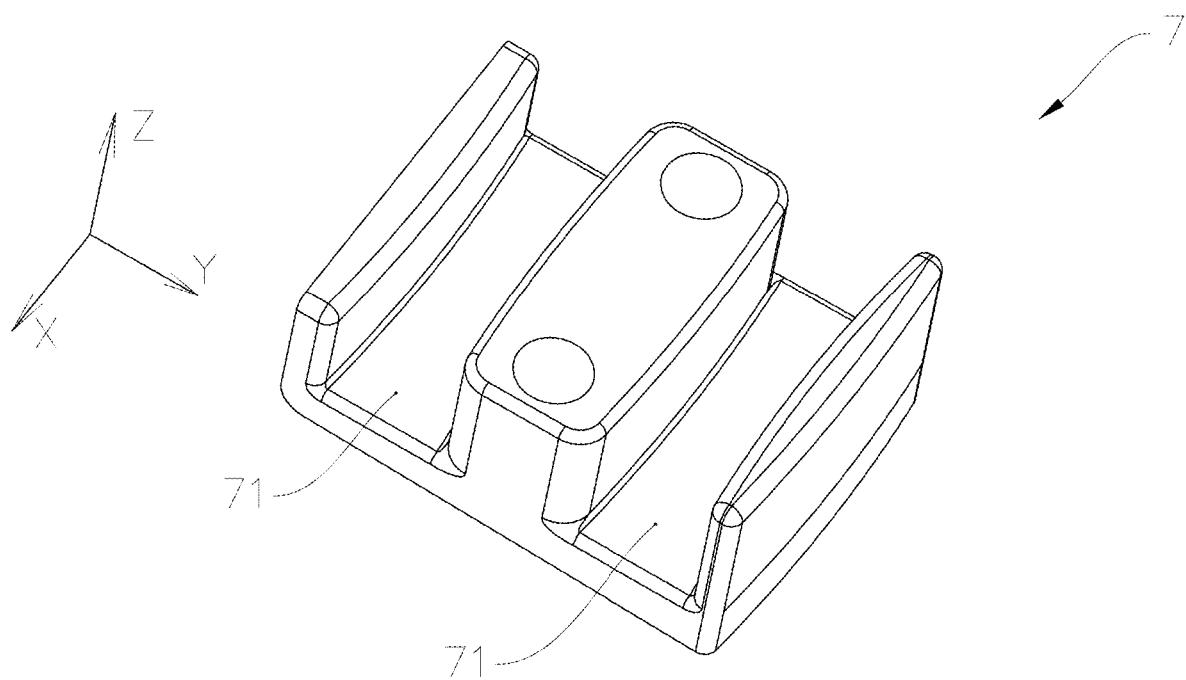
FIG. 18 is a structural diagram of a bottom guide member in sliding door Embodiment 1 of the present invention.

With reference to FIG. 17, the bottom guide member 7 is configured to cooperate with the track 2 and the pulleys 3 to guide and protect the movable door plates 1. In the height direction Z, the bottom guide member 7 is located below the track 2, that is, the bottom guide member 7 is mounted on the ground of the passage. Two limiting grooves 71 are provided on the bottom guide member 7, and the limiting grooves 71 run through the bottom guide member 7 in the first direction X. In addition, one limiting groove 71 is corresponding to one first slide groove 20, so that a door plate limiting site is formed between one limiting groove 71 and one first slide groove 20.

The following briefly describes a mounting process of the sliding door 100.

When the sliding door 100 needs to be mounted, one slide assembly is mounted in each first slide groove 20. The slide assembly includes the damper 4 and the two pulleys 3 located at two ends of the damper 4. In this case, the pulley 3 only has the support 31 and the roller assembly 32 mounted on the support 31. When the slide assembly is mounted in the first slide groove 20, the stop wall 314 on the support 31 of each pulley 3 is disposed close to a side wall of the track 2.

Then, the two damping generators 5 are each mounted in one corresponding insertion hole group 211. Then, the track 2 may be fixedly mounted on the ceiling of the passage.

Then, the slide assembly moves to the corresponding operation hole on the track 2. For example, the two pulleys 3 in the first one of the first slide grooves 20 are moved to the two first operation holes 222 on the first side wall 22 of the track 2 respectively, and the two pulleys 3 in the second one of the first slide grooves 20 are moved to the two second operation holes 232 on the second side wall 23 of the track 2 respectively.

Then, the corresponding hanging clamps 33 are mounted on each movable door plate 1. After mounting of the hanging clamps 33 on the movable door plate 1 is completed, the movable door plate 1 is mounted in one corresponding first slide groove 20, so that the movable door plate 1 is fixedly connected to the slide assemblies in the first slide groove 20. That the first movable door plate 1 is mounted in the first one of the first slide grooves 20 is used as an example. After mounting of the hanging clamps 33 on the first movable door plate 1 is completed, the top of the first movable door plate 1 and the hanging clamps 33 thereon extend from the opening of the first one of the first slide grooves 20 into the first slide groove 20, and the two hanging clamps 33 on the first movable door plate 1 are located in the accommodating sites 313 of the two supports 31 located in the first slide groove 20, respectively. Then, the first locking piece 34 is first mounted in the groove 3142 of one corresponding support 31 from the first one of the first operation holes 222 on the first side wall 22 of the track 2, and the connection hole 341 of the locking piece 34 is coaxial with the thread hole 3311 of the hanging clamp 33 on the corresponding support 31. Then, the first bolt 35 is in threaded connection with the thread hole 3311 of the hanging clamp 33 after penetrating through the connection hole 341 of the locking piece 34 from the first one of the first operation holes 222. Then, the second pulley 3 in the first one of the first slide grooves 20 is assembled. After mounting of one movable door plate 1 is completed, a mounting height of the movable door plate 1 may be adjusted by using the locking piece 34 and the bolt 35 of each pulley 3. Because the second movable door plate 1 is mounted in the same manner as the first movable door plate 1, no repeated description is made herein again.

After mounting and adjustment of each movable door plate 1 are completed, the decoration cover assembly 6 is mounted on the first side wall 22 and the second side wall 23 of the track 2, so that mounting of the sliding door 100 is completed. A mounting time of the bottom guide member 7 may be determined based on a specific mounting process of the sliding door 100. This is not specifically limited. For example, the mounting time of the bottom guide member 7 may be before mounting of the two movable door plates 1 or after the completion of mounting. This is not described in examples herein.

In addition, it should be noted that, in other embodiments, one first slide groove 20 may be provided on a track 2 only. Likewise, slide assemblies and movable door plates 1 are provided in the first slide groove 20. Correspondingly, the number of insertion holes included in a insertion hole group 211 on a track 2 and the number of triggering parts 51 of a damping generator 5 are adaptively adjusted to one. In this case, a sliding door 100 is set to include two tracks 2, two sliding assemblies and two movable door plates 1. In this case, functions of the sliding door 100 are consistent with functions of the sliding door 100 in this embodiment.

In conclusion, in the sliding door 100 provided in the present invention, it is simpler and more convenient to mount, adjust and replace the movable door plates 1, mounting and maintenance of the sliding door 100 are facilitated, and attractiveness of the sliding door 100 can be improved.

Sliding Door Embodiment 2

This embodiment is different from sliding door Embodiment 1 in that:

In this embodiment, the first tooth part is not provided on the bottom wall of the recess, and the second tooth part is not provided on the surface of the locking piece facing the recess, but the first tooth part is provided on a side wall of the recess, and the second tooth part is provided on a side wall of the locking piece. In addition, the second tooth part faces toward the first tooth part and meshes with the first tooth part.

Sliding Door Embodiment 3

This embodiment is different from sliding door Embodiment 1 in that:

In this embodiment, the first tooth part on the stop wall and the second tooth part on the locking piece are omitted. Instead, a gasket is provided between the stop wall and the locking piece. The gasket can increase friction force between the stop wall and the locking piece during relative movement, so as to prevent the locking piece from sliding relative to the stop wall after the locking piece and the bolt clamp the hanging clamp onto the stop wall, so that reliability of clamping the hanging clamp by using the locking piece and the bolt is improved, the movable door plate mounted on the hanging clamps is prevented from moving downwards after the completion of mounting, and the sliding door can be normally used. In addition, the movable door plate is protected from damage, thereby ensuring use safety of the sliding door.

It should be finally emphasized that the foregoing descriptions are merely preferred embodiments of the present invention, but are not intended to limit the present invention. A person skilled in the art can make various variations and changes to the present invention, and any modification, equivalent replacement, or improvement made without departing from the principle of the present invention shall fall within the protection scope of the present invention.

INDUSTRIAL APPLICABILITY

Through structural design of the low track assembly, the entire hanging clamp can be located in the support, the hanging clamp is prevented from extending out of the track. In addition, a width and height of the track do not need to be increased to hide the hanging clamp in the track, thereby ensuring overall attractiveness of the low track assembly and also ensuring overall attractiveness of the sliding door provided with the low track assembly. The stop wall with the second slide groove, the locking piece, and the bolt are provided on a frame, so that the locking piece and the bolt can fix the hanging clamp to the stop wall, and the hanging clamp moves along with the support, so that the movable door plate of the sliding door mounted on the hanging clamps is driven by the hanging clamps to move. In addition, with position arrangement of the stop wall, the second slide groove, and the first operation holes on the track, mounting difficulty of the movable door plate can be reduced, so that after the movable door plate is mounted on the low track assembly, the height position of the movable door plate is adjustable, and it is simpler and more convenient to replace the movable door plate, thereby greatly reducing later maintenance difficulty of the sliding door provided with the low track assembly.

The invention claimed is:

1. A low track assembly, comprising:
a track, having side walls and a plurality of first slide grooves running through the track in a first direction each of the side walls having a first operation hole therein in communication with a respective one of the first slide grooves; and
pulleys, wherein the pulleys are provided in the first slide grooves, the pulleys each comprise:
a support having a first accommodating groove and an accommodating site provided therein, the first accommodating groove extends through the support in the first direction and the accommodating site extends through the first accommodating groove in a second direction, the support further includes a stop wall disposed at a first end of the accommodating site, a second slide groove extends through the stop wall in the second direction and extends in a height direction of the track;
a roller assembly mounted on the support and engaging a respective one of the first slide grooves to guide the support as the support translates along the respective one of the first slide grooves;
a hanging clamp, a second accommodating groove extends through the hanging clamp in the first direction and is in communication with the first accommodating groove, wherein the hanging clamp is located in the accommodating site and a threaded hole extends through the hanging clamp in the second direction, and
a locking piece and a bolt, the locking piece including a connection hole extending therethrough in the second direction, wherein the stop wall is located between the locking piece and the hanging clamp, the bolt extends through the connection hole and the second slide groove and threadedly engages the threaded hole, the locking piece and the hanging clamp are capable of synchronously moving along the second slide groove, and the locking piece is capable of moving along the respective one of the first slide grooves to the first operation hole of the respective one of the first slide grooves;
wherein, the first direction, the second direction, and the height direction are perpendicular to each other.

2. The low track assembly according to claim 1, wherein first tooth parts are provided on the stop walls, second tooth parts are provided on the locking pieces, and first tooth parts mesh with second tooth parts.

3. The low track assembly according to claim 2, wherein third grooves (3142) are provided in the stop walls, the third grooves (3142) extend in the height direction and the second direction, the third grooves (3142) are recessed into the stop walls.

4. The low track assembly according to claim 3, wherein a plurality of bosses extend from the locking pieces in the second direction, the bosses are located in the second slide grooves, and the bosses are capable of sliding along the second slide grooves.

5. The low track assembly according to claim 3, wherein the first tooth parts are located on bottom walls of the third grooves (3142), and the second tooth parts are located on surfaces of the locking pieces facing the first tooth parts;
the first tooth parts include a plurality of first convex teeth, wherein the plurality of first convex teeth are distributed in the height direction; the second tooth parts include a plurality of second convex teeth, wherein the plurality of second convex teeth are distributed in the height direction, and the number of the first convex teeth is greater than the number of the second convex teeth; and
the supports are provided with roller concave sites on one side of the supports.

6. The low track assembly according to claim 1, wherein the low track assembly further comprises:
- dampers, wherein the dampers are located in the first slide grooves and each damper has triggering ends; and
- damping generators, wherein insertion holes that extend through the track in the height direction are provided on a bottom wall of the track, the damping generators have triggering parts, and the triggering parts penetrate through.

7. The low track assembly according to claim 6, wherein the number of the first slide grooves is two, and the two first slide grooves are linearly oriented.

8. The low track assembly according to claim 1, wherein the track further includes:
- a decoration cover assembly, wherein the decoration cover assembly covers the side walls of the track.

9. A sliding door, comprising a plurality of movable door plates, wherein the sliding door further comprises the low track assembly according to claim 1, a part of the movable door plates is located in the first accommodating grooves and the second accommodating grooves, and the movable door plates are fixedly connected to the hanging clamps.

\* \* \* \* \*